(12) United States Patent
Paterson et al.

(10) Patent No.: US 7,733,787 B1
(45) Date of Patent: Jun. 8, 2010

(54) DEPENDABILITY MEASUREMENT SCHEMA FOR COMMUNICATION NETWORKS

(75) Inventors: Robert Paterson, Ottawa (CA); John Dunning, Nepean (CA)

(73) Assignee: Ciena Corporation, Linthicum, MD (US)

( * ) Notice: Subject to any disclaimer, the term of this patent is extended or adjusted under 35 U.S.C. 154(b) by 1512 days.

(21) Appl. No.: 10/825,649

(22) Filed: Apr. 16, 2004

(51) Int. Cl.
*G01R 31/08* (2006.01)
*G06F 11/00* (2006.01)

(52) U.S. Cl. ............................. 370/242; 370/252; 714/1
(58) Field of Classification Search ................. 370/241, 370/252, 242, 216, 217, 219, 221
See application file for complete search history.

(56) References Cited

U.S. PATENT DOCUMENTS

| | | | |
|---|---|---|---|
| 2001/0053130 A1* | 12/2001 | Tanaka et al. | 370/252 |
| 2003/0039261 A1* | 2/2003 | Purpura | 370/408 |
| 2004/0052259 A1* | 3/2004 | Garcia et al. | 370/392 |

OTHER PUBLICATIONS

"Draft Technical Requirements on Outage Measurement Requirements for Packet Networks", AT&T (Y. Kogan and P. Tarapore), BellSouth (A.McCain), and Cisco (R. Holley and J. Huang), Aug. 4 to 8, 2003.

\* cited by examiner

*Primary Examiner*—Gregory B Sefcheck
*Assistant Examiner*—Nima Mahmoudzadeh

(57) ABSTRACT

A dependability measurement system for use in a communications network includes several functional components which work together to measure, analyze and report the dependability parameters and metrics. A performance measurement function measures performance parameters between a first location and a second location in the communications network. A service-affecting event computation function analyzes performance parameters measured by the performance measurement function. An equipment event measurement function monitors network elements of the communications network for occurrence of network element events. A population calculator determines components within the communications network which are related to the dependability metrics to be reported upon and calculates in-service time information for the components. Finally, a dependability metric calculator calculates, analyzes and reports user requested dependability parameters and metrics using information output from the service-affecting event computation function, equipment event measurement function and population calculator.

29 Claims, 4 Drawing Sheets

DEPENDABILITY MEASUREMENT SCHEMA FOR COMMUNICATION NETWORKS

FIELD OF THE INVENTION

The invention relates to measuring, analyzing and reporting dependability parameters and dependability metrics in communication networks.

BACKGROUND OF THE INVENTION

Currently, dependability Service Level Agreements (SLAs) existing between service providers and service customers and between service providers and solution vendors are ambiguous, vague and difficult to measure. As enterprises become increasingly more dependent on networks for their critical business services, service dependability is becoming an important attribute for service providers to guarantee to service customers. Service dependability refers to aspects of reliability, availability, maintainability, and survivability of services, networks, and network elements. The ability of a service provider to set clear and meaningful dependability SLAs can be a significant market differentiator. However, meaningful SLAs must be able to be measured in a way that reflects the experience of the service end-user or end-devices.

It is important to be able to properly reflect what the end-user experiences. However, whether an end-user experiences a network event is not always important in determining how the network event is classified. For example, mission-critical service users do not have to experience an outage for it to be identified as a service outage. This is especially true for safety-based services as the service customer is paying for around-the-clock service for the comfort of knowing that the service is ready for use when it is needed. In contrast, for a non-critical service such as Web-browsing, an outage may be considered a service outage only when directly experienced by the customer.

Performance measurement features, which measure packet delay, jitter and integrity, are common in conventional networks today. It is critical that any performance measurement monitoring of a service experience of the customer does not adversely impact network performance. The measurement of packet parameters must be done at a sufficient granularity to detect network failure events that matter to the service type of the customer and provide a proper determination of an event from an end-user or end-device perspective.

From a perspective of the end-user or end-device, performance thresholds are different depending on the usage profile stage (e.g. service access vs. service use) and timeliness requirements for the service application type. For example, an event that causes a 30 second packet delay would be considered a service outage for telephony but not for email. A service failure for PSTN telephony is when a subscriber experiences dial tone delay greater than 5 seconds or ring back delay greater than 9 seconds when trying to access the service and greater than 5 second delay (or the subscriber being disconnected and having to re-dial) when in a talk state. At these thresholds the subscriber would conclude that a service denial or premature disconnect had occurred. However, if the impairment lasted long enough such that after three attempts (when the typical subscriber abandons the call attempt), the subscriber would consider that the service is unavailable. This threshold is considered to be 30 seconds.

Today's communications network measurement of failure event data has focused on improving the effectiveness and efficiency of operations personnel. Network elements generate warning alarms and data regarding failure events that enable operational personnel to diagnose and field-repair the equipment. Network products exist today that are capable of assigning timing information to these alarms and data to facilitate the automated reporting of reliability-related metrics. However, this is not sufficient to provide meaningful SLAs since the information does not reflect the impact from the service customers' perspective.

The next generation network is a multi-service network that provides a wide range of service applications each with their own threshold criteria for service failure and service outage. The application types are real-time interactive such as voice, video conferencing, e-gaming, and financial transactions, real-time non-interactive such as video and television and non-real-time such as email and downloading files.

Currently operational personnel need to capture, analyze and compute data in order to track service dependability performance so that it can be compared to objectives. This requires a significant amount of manual effort and usually only considers network element failure modes, though a considerable contributor to end-to-end service dependability issue may be network failures, such as cable cuts. Therefore it would be advantageous to have an autonomous system that can measure, analyze and report network failure events in terms of dependability parameters and statistical dependability metrics.

SUMMARY OF THE INVENTION

A schema for measuring, analyzing, and reporting dependability parameters and dependability metrics in a communications network is provided. The schema is automated to run continuously over the network and report results as necessary.

Two methodologies are used in combination to implement an autonomous schema to report dependability information. In a first methodology, transmission quality performance parameters are measured along a service path. The service path can be a link between two network elements or across a single network element. The transmission performance results are compared to threshold criteria to determine if the event is a service failure. Time data is also collected. The results are analyzed to determine inter-network element dependability parameter information. In a second methodology, network elements are monitored for an occurrence of a network element alarm indicating a network element event, such as a network element failure. Intra-network element dependability parameter information such as event start time, event end time, event duration, repair duration, etc. is collected when the network element alarm is detected. Correlating the inter-network element dependability parameter information and the intra-network element dependability parameter information allows for determination of a location of a network event and an impact that the network event has on service.

An additional process in the method is identifying elements involved with particular dependability metrics to be reported and calculating in-service time for the elements. This provides valuable time frame related information for calculating statistically relevant dependability metrics.

Measuring dependability parameters and dependability metrics in this manner allow a system provider or solution vendor to initiate corrective and preventative action by having a better understanding of typical network events and their causes.

An automated dependability measurement feature of this type being permanently embedded in the communications network provides the advantage of being able to measure meaningful dependability parameters and metrics without impacting the end-user. The automated dependability measurement schema also eliminates the tedious process of attempting to analyze and correlate dependability data in a conventional manual fashion where the results may or may not reflect actual dependability SLAs.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
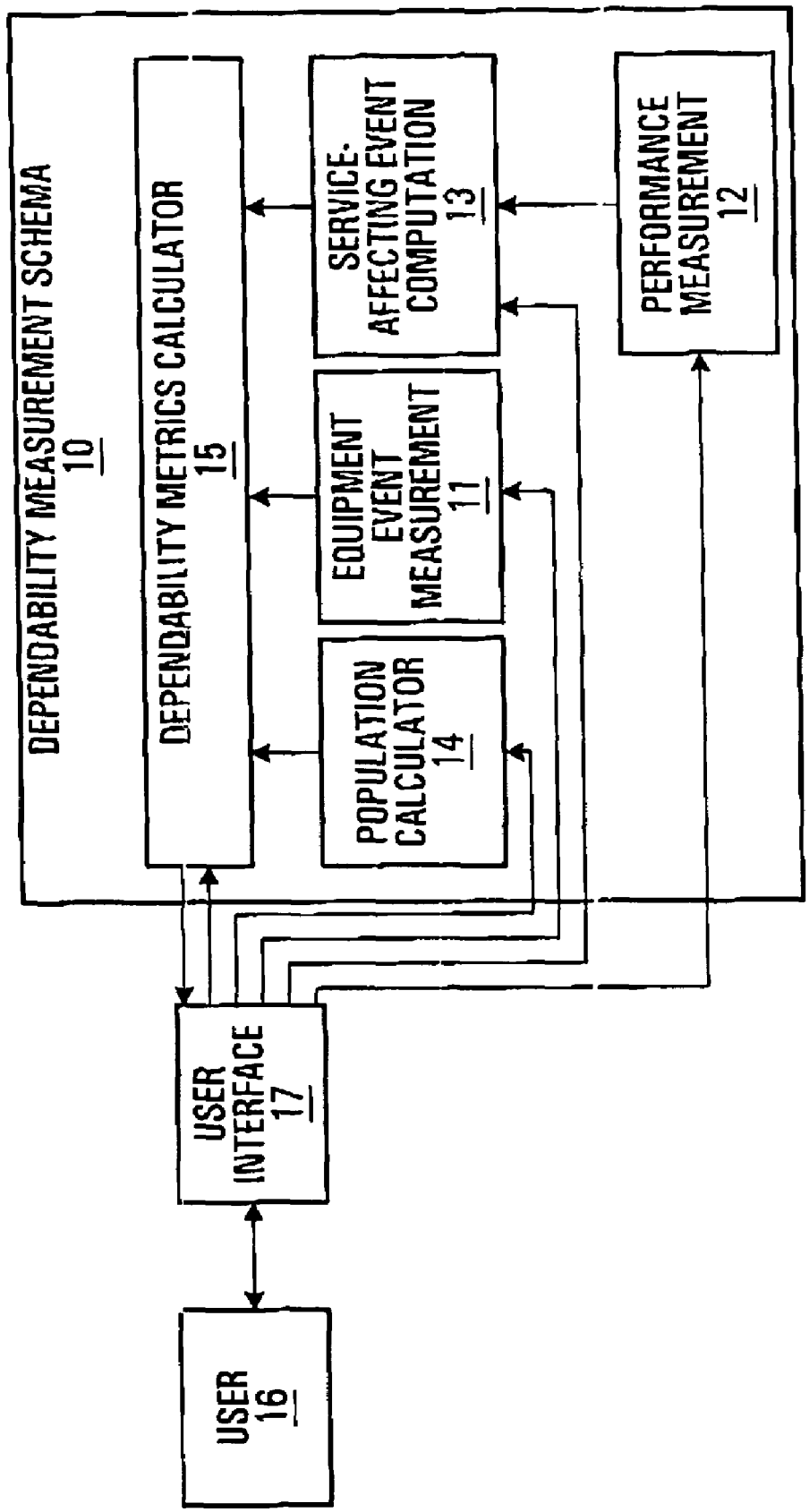
FIG. 1 is a schematic of interacting functional blocks of a dependability measurement schema (DMS) provided by an embodiment of the invention.

FIG. 1 is a schematic diagram of an architecture that comprises a dependability measurement schema (DMS) 10. The DMS 10 is comprised of five processes: an equipment event measurement (EEM) function 11, a performance measurement function 12, a service-affecting event computation (SEC) function 13, a population calculator 14 and a dependability metrics calculator 15. An output of the performance measurement function 12 supplies an input to the SEC function 13. Outputs from the SEC function 13, the EEM function 11, and the population calculator 14 are input to the dependability metrics calculator 15. Connections are provided between a user interface 17 and the EEM function 11, the performance measurement function 12, the SEC function 13, the population calculator 14 and the dependability metrics calculator 15. A user 16, for example a service provider employee, interacts with the DMS 10 via a user interface 17.

The EEM function 11 monitors, categorizes, stores information regarding network element events, such as a network element failure event, occurring at network elements of a communications network. The EEM function 11 resides within network elements of the communication network. The EEM function 11 constantly monitors network element for alarms that indicate the initiation of a network element event. The EEM function 11 also stores user-specified network element event information. For example, the EEM function 11 records timing information of the network element event and identifies an equipment cause. The EEM function 11 supplies the information to the dependability metrics calculator 15 for further dependability analysis. The user 16 supplies information to the EEM function 11 via the user interface 17 for defining particular parameters to be measured and user-specified network element event information to be stored.

The performance measurement function 12 provides a quantitative measure of transmission performance along a service path between two user-defined end points in a communications network. Measurements are performed at a sufficient frequency to detect service-affecting failures and provide a record of time of occurrence of the service-affecting failures. Measuring performance parameters using bi-directional Performance Information Response (PIR) signalling provides a manner to determine a quantitative measure of transmission performance. Examples of performance parameters are packet delay, jitter and integrity. The performance measurement function 12 resides within the network elements of the communications network at the endpoints of a network segment to be measured. Performance parameter information measured and stored by the performance measurement function 12 is output to the SEC function 13. Information is supplied from the user 16 to the performance measurement function 12 via the user interface 17 for defining performance measurement parameters such as what performance parameters are to be measured, frequency of measurement, and service paths to be measured.

The SEC function 13 uses the performance parameter information recorded by the performance measurement function 12 to determine if and/or when a performance measurement exceeds a user-specified dependability threshold. The SEC function 13 uses a sliding window analysis to determine when and for how long the performance parameter exceeds the dependability threshold. Results of the sliding window analysis are then stored by the SEC function 13. The SEC function 13 resides in the network elements at demarcation points of the communication network. Demarcation points are defined as first and second endpoints of a user-specified service path between which dependability parameters are measured. In some instances this would include network elements at an edge of a communications network and in other instances the end points of the user-specified service path could be located anywhere within the communications network. The SEC function 13 can also be used to measure performance parameters across a single network element within the user-specified service path. Information is supplied from the user 16 to the SEC function 13 via the user interface 17 for defining dependability analysis parameters such as thresholds for defining failures and outages and time period of the sliding window in the sliding window analysis.

The population calculator 14 is responsible for determining in-service time information for equipment in the network. The in-service time information is used in combination with dependability parameters to allow time frame specific dependability metrics to be calculated and reported. Examples of equipment in the network are the network elements and network element links. First the equipment relevant to each service type or dependability metric being reported has to be identified. Input supplied by the user 16 via the user interface 17 comprises an operating time period over which the metrics are to be calculated. This allows the population calculator 14 to identify the resultant in-service time for the operating time period.

The dependability metrics calculator 15 calculates, analyzes and reports dependability parameter and dependability metrics. This allows dependability metrics to be compared to user-defined dependability metric objectives set out is existing Service Level Agreements (SLA). The dependability metrics calculator 15 can also determine and report on factors that contribute to network events based on analysis of information supplied by the EEM function 11 and the SEC function 13. Based on analysis performed by the dependability metrics calculator 15 the network event can be properly classified and reported. The user 16 supplies information to the dependability metrics calculator 15 via the user interface 17 for defining dependability report parameters such as dependability parameters and metrics to be reported, time frame of a report, metric objectives, and confidence limits of statistical analysis.

Figure 2:
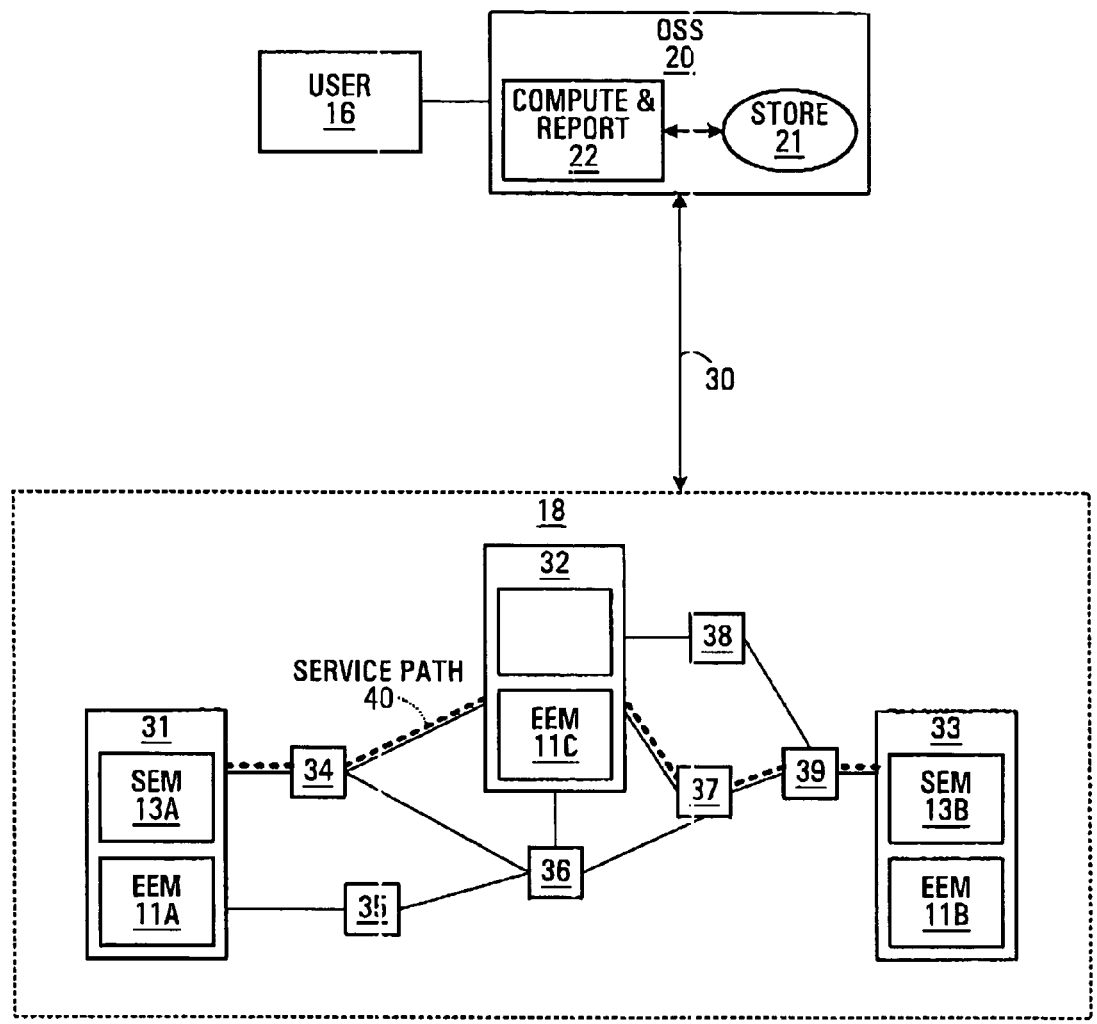
FIG. 2 is a schematic of the dependability measurement feature provided by an embodiment of the invention implemented with respect to a communications network.

FIG. 2 is an example schematic of how the DMS 10 of FIG. 1 is implemented with respect to a communications network 18. An operational service system (OSS) 20 is a single location for information received from a plurality of network elements, or nodes, 31-39 to be stored, analyzed and reported. The OSS 20 contains some of the processes of the DMS 10 in the compute and report functional block 22 such as the population calculator 14 and the dependability metrics calculator 15. The OSS 20 also contains a memory storage device 21. A user 16 interfaces with the OSS 20 to communicate with the DMS 10 as described above.

The communications network 18 is comprised of the plurality of network elements 31-39 and interconnecting links. Each network element 31-39 comprises SEC functionality and EEM functionality. For example, network element 31 contains SEC function 13A and EEM function 11A. Each network element 31-39 further comprises a memory storage device (not shown) for storing information generated by the respective EEM function 11 and the SEC function 13. The OSS 20 and the communications network 18 are coupled via network connection 30 to allow for EEM and SEC information flow between the network elements 31-39 and the OSS 20.

The DMS 10 integrates two measurement methodologies. A first methodology is an intra-network element methodology performed by the EEM functionality within each network element 31-39. The EEM functionality is used to detect network element events associated with the network element 31-39. User-specified information regarding the network element event is collected and stored at the network element 31-39. For example, EEM function 11A monitors network element 31 for an alarm indicating a network element event, EEM function 11B monitors network element 33 for an alarm indicating a network element event and EEM function 11C monitors network element 32 for an alarm indicating a network element event. Examples of the user-specified information are described below with regard to FIG. 3. The user-specified information is reported to the OSS 20 via the network connection 30.

A second methodology is an inter-network element methodology performed by the SEC functionality. The SEC functionality performs point-to-point measurements along a service path. For example, network elements 31 and 33 are connected by a service path 40 shown as a broken line. The service path 40 comprises additional network elements 34,32, 37,39 as well as the respective interconnecting links between the network elements 34,32,37,39. SEC functions 13A and 13B perform the point-to-point measurements required to identify a network event. For example, the bi-directional PIR signalling is used to measure packet delay, jitter and integrity between network elements 31 and 33. Information regarding the point-to-point measurements is stored locally at the network elements 31-39, including measurement and/or storage time and date information and is reported to the OSS 20 via the network connection 30. Note that network element 32 has no SEC functionality in this example as the end points of interest are only network elements 31 and 33. Referring to FIG. 2, the information can be stored at network element 31 or network element 33 and in some situations it may be advantageous that the information be stored at both network elements 31 and 33.

Both the first and second methodologies are used to determine a location of a network event and a resulting impact on service that the network event creates.

The information measured and stored by the EEM functionality and SEC functionality in the network elements can be transmitted to the OSS 20 at any desired periodic or non-periodic interval, for example on a weekly, bi-weekly or even monthly basis. It may also be advantageous for the network elements to have the ability to transmit information to the OSS 20 outside the normal transmission times, such as when a network event or network element event has been identified.

The description of FIG. 2 is a representation of a particular embodiment provided by the invention. In the particular embodiment the computation of the dependability metrics and reporting of the results is done centrally at the OSS. However, in other embodiments of the invention some of the processes performed by the EEM functionality or the SEC functionality may be performed within the OSS 20 as opposed to in a respective network element. Conversely, processes involved with the population calculator 14 or the dependability metrics calculator 15 conventionally performed within the OSS 20 may be performed within the respective network element instead of the OSS 20. In some situations it may also be advantageous to have multiple OSS locations, each OSS location for maintaining and analyzing information from a portion of the plurality of network elements. The multiple OSS locations then supplying a primary OSS location the required information for final reporting.

The OSS 20 could be any type of computer processing equipment. For example, the OSS can be a network server or a conventional desktop computer. The OSS 20 has a memory storage device capable of storing a computer program having code means for communicating with the network elements to retrieve information from the EEM functionality and the SEC functionality in the network elements, code means for calculating dependability parameters and dependability metrics based on the information from the network elements and code means for reporting the dependability parameters and dependability metrics to the user. The memory storage device capable of storing a computer program may or may not be memory storage device 21 described above.

Each network element has a memory storage device capable of storing a computer program having code means for performing the EEM functionality, code means for performing the SEC functionality and code means for communicating with the OSS 20. The memory storage device capable of storing a computer program may or may not be the same memory storage device for storing information generated by the EEM functionality and the SEC functionality as described above.

It is not necessary for all network elements to have both SEC and EEM functionality. The network elements have SEC and EEM functionality as necessitated by the communications network 18 and desired monitoring and reporting requirements defined by the user.

The inter-network element methodology can be implemented in various ways. PIR signalling is one manner in which the performance can be measured. In a particular embodiment of the invention measuring performance parameters with PIR signalling is performed using data packets, also known as bearer packets. For example in FIG. 2, network element 31 would duplicate at least one bearer packet and label the at least one duplicated bearer packet for identification as an at least one PIR signalling packet. The at least one duplicated bearer packet is then inserted into the service path 40. The at least one duplicated bearer packet traverses the service path 40 until arrival at network element 33. At network element 33 the at least one duplicated bearer packet is analyzed for relevant performance parameter information such as packet delay, jitter, and integrity. The performance parameter information is then encapsulated in a performance information packet and returned across the service path 40 to network element 31. When the performance information packet is received at network element 31 the performance information is extracted by the SEC function 13A. SEC function 13A then analyzes the performance parameter information.

In some embodiments network element 33 does not analyze received duplicated bearer packets for relevant performance information, but simply re-encapsulates the received duplicated bearer packets and returns them to network element 31 and network element 31 analyzes the returned bearer packets for performance parameter information. The PIR signalling process as described above with respect to network elements 31 and 33 operates in both directions. The PIR signalling process as described can operate between any two network elements in the network or across a single network element.

The inter-network element methodology can also use bearer packets for gathering network element dependability information to be processed by the EEM function 11. In a particular embodiment for example and again referring to FIG. 2, bearer packets are duplicated and labelled at an input to network element 31. At an output of network element 31 performance parameter information is extracted by EEM function 11A and dependability information collected. As described previously this is a process that occurs on an ongoing basis for all network elements that require such monitoring.

The DMS can be used for different degrees of reporting depending on the requirements of the user. The DMS can be used for dependability parameter reporting or dependability metric reporting or both dependability parameter reporting and dependability metric reporting. Dependability parameter reporting supplies the user with network event and network element event information that has been correlated using both the inter-network element methodology and the intra-network element methodology, such as event start time, event end time, event duration, identification of the component experiencing the network element event, classification of type of event, start of repair time, end of repair time, duration of repair time. Dependability metric reporting involves using the dependability parameter data in conjunction with the service path population information from the population calculator 14 to compute and statistically analyze end-to-end and nodal dependability metrics for the user. Dependability metric reporting encompasses dependability parameter reporting but also includes additional valuable information regarding a statistical time-varying nature of the dependability parameters. The DMS monitors networks over a user-defined operating time period. In this manner the DMS can be used to track and report dependability metrics on an ongoing and/or long term basis to determine if objectives of the SLA are being met and/or improved upon.

Some dependability metrics that can be reported by the DMS are: individual service outage downtime, individual service outage frequency, individual service failure rate, network element failure mode outage downtime, network element failure mode outage frequency, mean-time-to-restore service, intrinsic mean-time-to-repair, and total mean-time-to-repair. The dependability metrics can be calculated and analyzed based on standards such as T1A1.2 Network Survivability to ensure industry standardized reporting.

Based on dependability parameter data the DMS can also be used to track, analyze, and report causes that contribute to network events such as hardware, software, cable cuts, power outages, procedural, congestion, etc.

Figure 3:
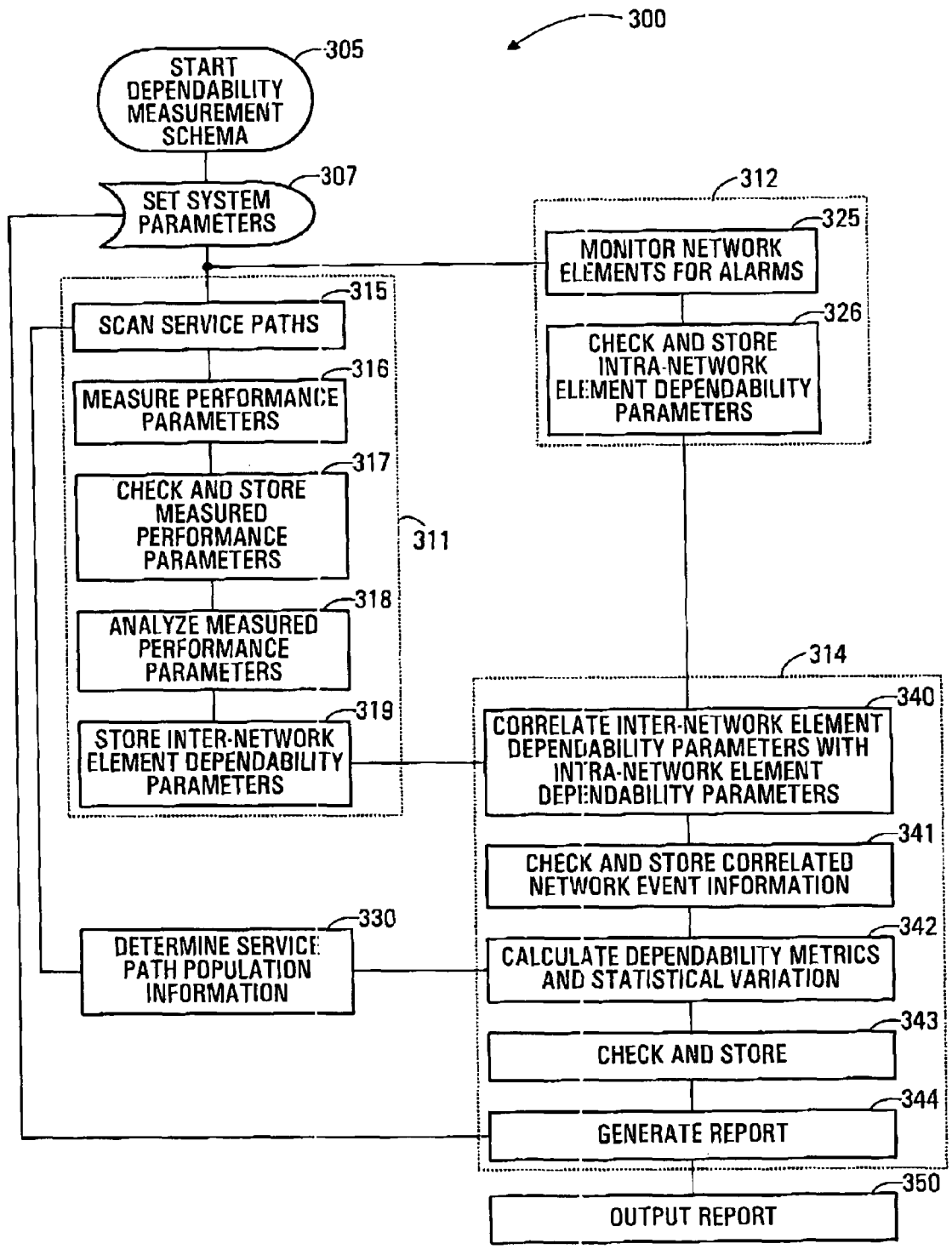
FIG. 3 is a flow chart depicting the operation of a dependability measurement feature provided by an embodiment of the invention.

FIG. 3 is a flow chart 300 that illustrates how the DMS 10 operates in a particular embodiment of the invention to generate end-to-end service dependability and nodal dependability results. The flow chart 300 is intended to show how the functions of the DMS 10 operate, but the flow chart 300 is not meant to designate a literal time based operational flow. This is to say that multiple processes identified in the flow chart 300 may be occurring simultaneously while the DMS 10 is in operation and that embodiments of the invention should not be limited to the strict sequential flow as described below.

The first step 305 of the flow chart is starting the DMS process. At some time during operation of the DMS process user-defined system parameters are set 307. Before the user defines system parameters, or if no system parameters are defined, default system parameters are used. The system parameters include performance measurement parameters such as, but not limited to: defining service paths including the network elements and interconnecting links, defining a frequency of parameter measurement, and defining performance parameters to be measured such as packet delay, jitter, and integrity. When setting the parameters at step 307 the user may also set dependability analysis parameters such as, but not limited to: defining a time period for a window of a temporal sliding window analysis used in a dependability analysis of measured performance parameters, defining failure thresholds for applications such as voice, video conferencing, financial transactions, etc. and defining outage thresholds for service types such as real-time interactive, real time non-interactive, and non-real time. It is possible to change the system parameters at any time while the DMS is operational. In FIG. 3 the setting of the system parameters are shown as a step 307 occurring after starting the DMS 10, however more generally, the system parameters could be set at anytime, for instance before the DMS 10 is started or at some other time while the DMS 10 is in operation.

During operation, one of the parallel processes that is operating is an inter-network element measurement process 311. A number of inter-network element measurement functions in operation is based on a number of service links that the user specifies to be monitored. The inter-network element measurement process 311 comprises multiple sub-processes 315, 316, 317, 318, 319. A first sub-process 315 is scanning of one or more service paths which involves using PIR signalling between two locations. PIR signalling is performed on a recurring basis, the frequency of which is defined when the system parameters are set. For example, the frequency of performing the PIR signalling may range from 500 milliseconds (ms) to 5 seconds. More generally, the PIR signalling is performed at an interval appropriate to the requirements of the user. A second sub-process 316 involves measuring performance parameters such as delay, jitter, and integrity on each service path based on the information recovered from the PIR signalling. The measured performance parameters are checked for data errors and consistency and subsequently stored 317 at one or both network elements involved in the measurement sub-process. A combination of sub-processes 315, 316 and 317 is essentially the performance measurement function 12 as described above.

A further sub-process 318 within the inter-network element measurement process 311 involves performing a dependability analysis on the measured performance parameters to identify if a network event has occurred and if so, for how long. One example of performing the dependability analysis is using a temporal sliding window to determine when and for how long measured performance parameters exceed a user-defined threshold. The user-defined threshold can be a failure threshold for applications or an outage threshold for service types. Results from the dependability analysis are used in generating inter-network element dependability parameter information. An additional sub-process 319 of the inter-network element measurement process 311 is to store the inter-network element dependability parameter information at one or both network elements. Additional calculations can be performed at sub-process 318 as well, such as checking for data errors and consistency of the inter-network element dependability parameter information. The inter-network element measurement process 311 continues on each respective service path until it is stopped. The inter-network element measurement process 311 is also capable to be turned "on" and "off" at any time during a measurement time period by control of the performance measurement function 12 and the SEC 13 function. A combination of sub-processes 318 and 319 are essentially the SEC function 13 as described above.

The first sub-process 315 of the inter-network element measurement process 311 supplies service path information to sub-process 330. Sub-process 330 uses the service path information to determine service path population parameter information. The service path information is based on the user-defined system parameters supplied to the DMS 10 in step 307. Sub-process 330 uses the service path information, such as equipment that is involved with each service path, the distance of interconnecting links between network elements, etc. in determining the in-service time for the equipment in the service path. The sub-process 330 is also supplied with the operating time frame within which the dependability metrics are to be reported as one of the user-defined system parameters which is set in step 307. The service path population parameter information is used by the dependability metrics calculator 15 in the process of calculating statistically relevant dependability metrics. Sub-process 330 is essentially the population calculator 14 as described above.

Another main process of the flow chart 300 operating in parallel with the inter-network element process 311 is an intra-network element process 312. Upon initiating operation 305 of the DMS 10 each network element begins a sub-process 325 of monitoring the network element for alarms that indicate a network element event, such as a failure, at the network element. When an alarm is detected user-specified information regarding the event is collected. The user-specified information is checked for data errors and consistency and then stored 326 at the network element. The user-specified information is intra-network element dependability parameter information such as event start time, event end time, the proper identification of the network element or functional component that is undergoing the network element event, as well as any other pre- and post-event information that is deemed useful by the user in reporting dependability parameters or dependability parameters. The intra-network element measurement process 312 continues until it is stopped. A combination of sub-processes 325 and 326 are essentially the EEM function 11 as described above.

The inter-network element dependability parameter information stored at sub-process 319 of the inter-network element process 311 is supplied to a dependability metric calculation process 314. The intra-network element dependability parameter information stored at sub-process 326 of the intra-network element process 312 is also supplied to the dependability metric calculation process 314. A first sub-process 340 of the dependability metric calculation process 314 is to correlate the inter-network element dependability parameter information and the intra-network element dependability parameter information. As described previously, correlating network event information from the inter-network element process 311 and the intra-network element process 312 provides the opportunity to determine the network event trigger. The correlation of the network event information is also used to determine the impact of the network event to the customer in terms of classifying the network event appropriately. Examples of classifications of the network event are a service outage, a service affecting failure or a non-service affecting failure. The result of the correlation of the network event information in checked and stored at sub-process 341. The service path population parameter information output from sub-process 330 and correlation information output from the first sub-process 340 are passed to a third sub-process 342 of the dependability metric calculation process 314 that calculates dependability metrics and statistical variations. The dependability metrics, statistical variations and dependability parameters are checked and stored 343 following calculation.

A further sub-process 344 of the dependability metric calculation process 314 accepts user-defined report parameters to define a scope for the dependability report and formats the stored dependability metrics and dependability parameters accordingly. The report parameters include, but are not limited to: identifying the name of the metric to be reported, the time frame that the report is reporting upon, the pre-determined SLA objective that the dependability metric is suppose to achieve, and confidence limits to be imposed by the statistically analysis. The report parameters can be input to the DMS at anytime. For example, the report parameters can be input at the same time as the system parameters at step 307. The final step 350 of the flow chart 300 is outputting the report to the user.

Report results can be formatted in any conventional data presentation format such as tables, graphs, or charts. The report can be supplied to the user in any desired format such as a hard copy on paper or any desirable type of soft copy format, for example a word processing document, database file, or email. The report can also be a continually updated video monitor that displays information in the format preferred by the user.

Figure 4A:
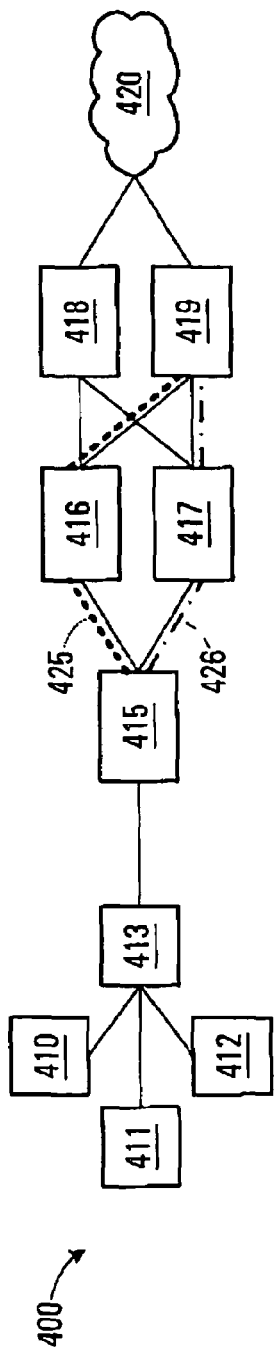
FIG. 4A is a schematic of a basic communications network upon which a DMS is operating.

FIG. 4A is a schematic of a basic communications network 400. Referring to FIG. 4, three terminus network components 410,411,412 are connected to a first network element 413. The first network element 413 is connected to a second network element 415. The second network element 415 is connected to third and fourth network elements 416,417. The third network element 416 is connected to fifth and sixth network elements 418,419. The fourth network element 417 is also connected to the fifth and sixth network elements 418,419. The fifth and sixth network elements 418,419 are each connected to a larger network 420. A first service path 425 is shown between the second network element 415 and the sixth network element 419 via the third network element 416. An alternate service path 426 is shown between the second network element 415 and the sixth network element 419 via the fourth network element 417. All the network elements 415,416,417,418,419 of FIG. 4 contain the EEM function 11 as provided by embodiments of the invention to monitor and store network element event information the second and sixth network elements 415,419 contain the SEC function 13 as provided by embodiments of the invention to measure, store, and analyze network event information.

Figure 4B:
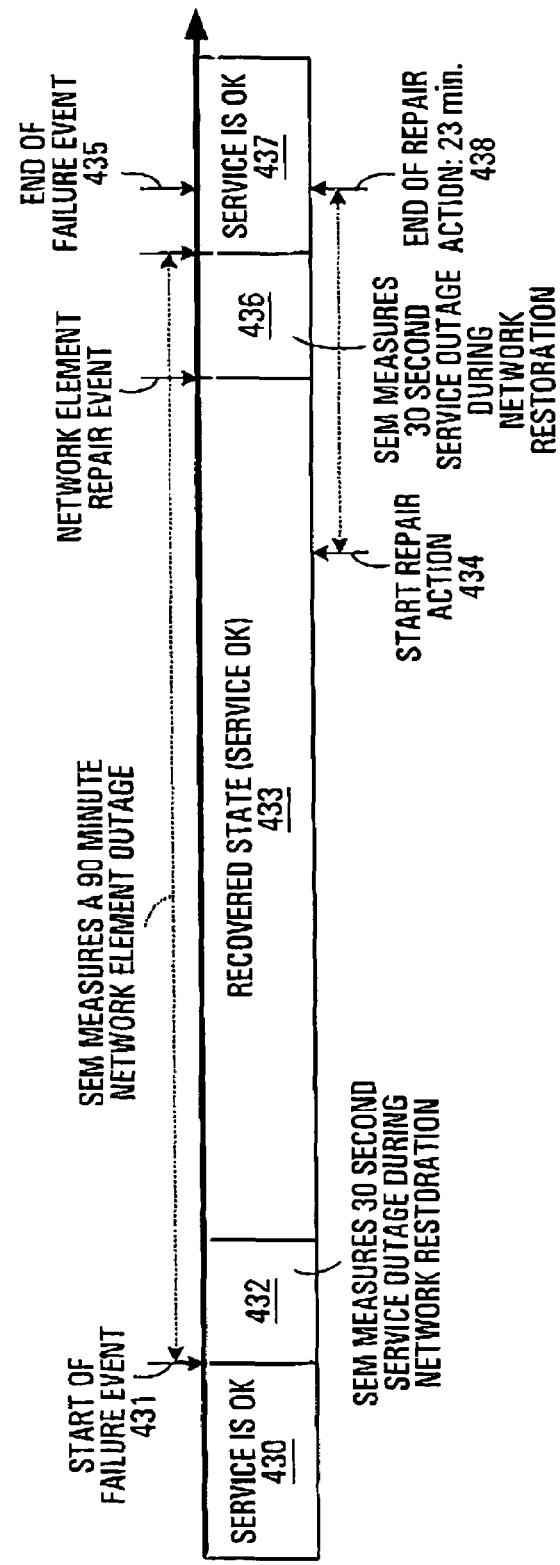
FIG. 4B is an example timeline detailing events that are measured, recorded and reported by the DMS when a failure event occurs in the basic communications network of FIG. 4A.

FIG. 4B is an example timeline of a network element event occurring at the third network element 416 of the basic communications network 400 of FIG. 4A. In the example the network element event happens to be a failure event. The SEC function 13, located in second network element 415 in this example is performing performance parameter measurements along the first service path 425 between the second network element 415 and the sixth network element 419. Service is indicated to be okay 430 in FIG. 4B until the failure event occurs 431. When the failure event occurs 431 the EEM function 11 of the third network element 416 detects an alarm. The EEM function 11 records the start time 431 of the failure event. Network service personnel are also alerted to the failure event at this time due to the alarm. The SEC function 13 registers a first 30 second service outage 432 as traffic is re-routed to the alternate service path 426 during network restoration. Following restoration the SEC function 13 again indicates service to be okay 433. A repair operation is started 434 at some point in time after the failure of the third network element 416 is identified by network service personnel. Once the third network element 416 is put back into service a second 30 second service outage 436 is registered by the SEC function 13 as traffic is re-routed through the first service path 425 via repaired third network element 416. Following the second 30 second service outage 436, the SEC function 13 indicates service is okay 437. The start time 434 of the repair operation and an end time 438 of the repair operation are recorded by the EEM function 11. The end time 438 of the repair operation is considered to be after the third network element 416 is brought back on-line and network diagnostics are used to confirm the third network element 416 is working properly, not when the third network element 416 is put back into service. The EEM function 11 also records an end time 435 of the failure event of the third network element 416. The end time of the failure event 435 coincides with the end time of the repair operation 438.

Table 1 contains dependability parameter data collected by the SEC function 13 of the second network element 415 and dependability parameter data collected by the EEM function 11 of the third network element 416 for the example of FIG. 4B.

TABLE 1

Dependability Data

| SEC | EEM |
|---|---|
| Event: Network Element Failure | Event: Network Element Failure |
| Date: Mar. 15, 2004 | Date: Mar. 15, 2004 |
| Start: 11:26:25 am | Start: 11:26:25 am |
| End: 11:26:55 am | End: 12:56:21 pm |
| Duration: 30 sec | Duration: 90 mins |
| Event: Network Element Repair | Repair Start: 12:36 pm |
| Date: Mar. 15, 2004 | Repair End: 12:59 pm |
| Start: 12:36:15 pm | Duration: 23 mins |
| End: 12:36:45 pm | |
| Duration: 30 sec | |

As described above both EEM and SEC data are used to determine a location of a network event and an impact on service that the network event causes. Correlation of the EEM and SEC functions 11,13 allow a proper assessment of the event to be reported. By only using EEM data, which is what is available in conventional systems, the event would appear as a 90 minute service outage, not a service outage of only 1 minute as actually occurred. This can be an important distinction for service providers and service customers and service providers and solution vendors when assessing how well dependability SLA are being met.

Table 2 contains an example of several dependability metric results that are calculated by the dependability metrics calculator 15 of the DMS 10. The dependability metrics calculator 15 uses dependability parameter data supplied by the EEM and SEC functions 11,13 over the course of multiple network events, including the specific failure timeline shown in FIG. 4B, as well as in-service time for elements in monitored service paths and total operating time frame information supplied by the population calculator 14. The in-service time for elements and total operating time frame are not shown but can be assumed to be more than a year in this example.

TABLE 2

Dependability Metrics: (averaged over time)

| Metric | Actual | Objective |
|---|---|---|
| Access Downtime | 2.2 min/yr | 5 min/yr |
| Access Outage Downtime | 45 min | 35 min |
| NE Downtime | 6.8 min/yr | 3 min/yr |
| NE Restore Time | 205 min | 180 min |
| NE Repair Time | 35 min | 30 min |

Numerous modifications and variations of the present invention are possible in light of the above teachings. It is therefore to be understood that within the scope of the appended claims, the invention may be practised otherwise than as specifically described herein.

We claim:

1. A dependability measurement system comprising;
    performance measurement means for measuring performance parameters between a first location and a second location in a communications network at sufficient frequency to detect service-affecting failures and time-of-occurrence;
    service-affecting event computation means for analyzing performance parameters measured by the performance measurement means;
    equipment event measurement means for monitoring network elements of the communications network for the occurrence of network element events;
    population calculator means for determining components within the communications network which are related to dependability metrics to be reported upon and calculating in-service time information for the components;
    dependability metric calculator means for calculating, analyzing and reporting dependability parameters and dependability metrics using information output from the service-affecting event computation means, equipment event measurement means and population calculator means; and
    a user interface for supplying the dependability measurement system with system parameters and control information
    wherein the dependability metric calculator means comprises information correlation means for correlating information from the service-affecting event computation means and the equipment event measurement means.

2. A dependability measurement system according to claim 1, wherein the performance measurement means comprises means for providing performance information request (PIR) signalling between the first location and the second location in the communications network.

3. A dependability measurement system according to claim 2, wherein the means for providing PIR signalling uses packets in measuring performance parameters.

4. A dependability measurement system according to claim 1, wherein the performance parameters to be measured provide a quantitative measure for determining transmission performance.

5. A dependability measurement system according to claim 1, wherein the performance parameters to be measured are at least one of packet delay, jitter, and integrity.

6. A dependability measurement system according to claim 1, wherein the performance measurement means further comprises means for storing measured performance parameters.

7. A dependability measurement system according to claim 6, wherein the means for storing measured performance parameters is configured to store time and date information corresponding to at least one of the time of measurement of the measured performance parameters and the time of storage of the measured performance parameters.

8. A dependability measurement system according to claim 1, wherein the first location and the second location define end points of a service path between first and second network elements.

9. A dependability measurement system according to claim 1, wherein the first location and the second location define end points of a service path between an input and output of a single network element.

10. A dependability measurement system according to claim 1, wherein the service-affecting event computation means comprises means for analyzing measured performance parameters to generate dependability parameter information.

11. A dependability measurement system according to claim 10, wherein the service-affecting event computation means further comprises means for storing dependability parameter information.

12. A dependability measurement system according to claim 1, wherein a network element event is a network element failure event.

13. A dependability measurement system according to claim 1, wherein the equipment event measurement means comprises;
   means for monitoring a network element for an alarm generated in response to a network element event;
   means for collecting user-specified information relating to the network element event; and
   means for storing user-specified information relating to the network element event.

14. A dependability measurement system according to claim 1, wherein the dependability metric calculator means further comprises means for calculating and storing dependability metrics based on information output from the information correlation means and the in-service time information from the population calculator means.

15. A dependability measurement system according to claim 1, wherein the dependability parameters are at least one of event start time, event end time, event duration, identification of the component experiencing an event, classification of type of the event, start of repair time, end of repair time, duration of repair time.

16. A dependability measurement system according to claim 1, wherein the dependability metrics are at least one of individual service outage downtime, individual service outage frequency, individual service failure rate, network element failure mode outage downtime, network element failure mode outage frequency, mean-time-to-restore service, intrinsic mean-time-to-repair, and total mean-time-to-repair.

17. A dependability measurement system comprising;
   performance measurement means for measuring performance parameters between a first location and a second location in a communications network at sufficient frequency to detect service-affecting failures and time-of-occurrence;
   service-affecting event computation means for analyzing performance parameters measured by the performance measurement means;
   equipment event measurement means for monitoring network elements of the communications network for the occurrence of network element events;
   population calculator means for determining components within the communications network which are related to dependability metrics to be reported upon and calculating in-service time information for the components;
   dependability metric calculator means for calculating, analyzing and reporting dependability parameters and dependability metrics using information output from the service-affecting event computation means, equipment event measurement means and population calculator means; and
   a user interface for supplying the dependability measurement system with system parameters and control information;
   wherein the service-affecting event computation means further comprises;
   means for analyzing at least one measured performance parameter using temporal sliding window analysis means to determine if the at least one measured performance parameter exceeds a user-specified dependability threshold;
   means for determining for how long the at least one measured performance parameter exceeds a user-specified dependability threshold; and
   means for storing dependability parameter information resulting from analyzing the at least one measured performance parameter.

18. A dependability measurement system according to claim 17, wherein the user-specified dependability threshold further comprises at least one of a failure threshold for applications and an outage threshold for service types.

19. A method for use in a dependability measurement system of a communications network comprising;
   measuring performance parameters between a first location and a second location in a communications network;
   analyzing measured performance parameters;
   monitoring network elements of the communications network for the occurrence of network element events;
   determining equipment within the communications network related to dependability metrics to be reported upon and calculating in-service time information for the equipment; and
   calculating, analyzing and reporting dependability parameters and dependability metrics using information resulting from analyzing measured performance parameters, monitoring network element events and calculating the in-service time information for the equipment related to dependability metrics to be reported upon;
   wherein calculating and analyzing comprises correlating information resulting from analyzing measured performance parameters and monitoring network element events.

20. A method according to claim 19, further comprising defining dependability measurement system parameters.

21. A method according to claim 20, wherein the dependability measurement system parameters are at least one of performance measurement parameters, dependability analysis parameters and dependability report parameters.

22. A method according to claim 19, wherein the measuring performance parameters step further comprises storing measured performance parameter results.

23. A method according to claim 19, wherein the measuring performance parameters step comprises performing PIR signalling between the first location and the second location in the communications network.

24. A method according to claim 19, wherein the analyzing measured performance parameters step comprises analyzing measured performance parameters to generate dependability parameters.

25. A method according to claim 19, wherein the analyzing measured performance parameters step further comprises storing dependability parameters.

26. A method for use in a dependability measurement system of a communications network comprising;
measuring performance parameters between a first location and a second location in a communications network;
analyzing measured performance parameters;
monitoring network elements of the communications network for the occurrence of network element events;
determining equipment within the communications network related to dependability metrics to be reported upon and calculating in-service time information for the equipment; and
calculating, analyzing and reporting dependability parameters and dependability metrics using information resulting from analyzing measured performance parameters, monitoring network element events and calculating the in-service time information for the equipment related to dependability metrics to be reported upon;
wherein the analyzing measured performance parameters step further comprises;
analyzing at least one measured performance parameter using temporal sliding window analysis means to determine if the at least one measured performance parameter exceeds a user-specified dependability threshold;
determining for how long the at least one measured performance parameter exceeds a user-specified dependability threshold; and
storing dependability parameter information resulting from analyzing the at least one measured performance parameter.

27. A method according to claim 19, wherein the monitoring individual network elements step comprises;
monitoring a network element for an alarm generated in response to a network element event;
collecting information relating to the network element event; and
storing information relating to the network element event.

28. A communications network capable of operating a dependability measurement system, the communications network comprising:
a plurality of network elements comprising:
performance measurement means for measuring performance parameters between a first location and a second location in a communications network at sufficient frequency to detect service-affecting failures and time-of-occurrence;
service-affecting event computation means for analyzing performance parameters measured by the performance measurement means; and
equipment event measurement means for monitoring network elements of the communications network for the occurrence of network element events;
communication links established between the plurality of network elements;
an operation service system comprising:
population calculator means for determining components within the communications network which are related to dependability metrics to be reported upon and calculating in-service time information for the components; and
dependability metric calculator means for calculating, analyzing and reporting dependability parameters and dependability metrics using information output from the service-affecting event computation means, equipment event measurement means and population calculator means, the operation service system having a memory storage device and an user interface;
wherein the dependability metric calculator means comprises information correlation means for correlating information from the service-affecting event computation means and the equipment event measurement means or the plurality of network elements; and
a communication link between the plurality of network elements and the operation service system.

29. A computer readable medium for use with a computer usable medium, the computer readable medium having computer readable program code means embodied therein for execution by a computer processor for operating an operational service system of a dependability measurement system, the computer readable code means comprising:
code means for interfacing with network elements that measure point-to-point performance parameters along a service path between at least two locations to determine an occurrence of a network event and collect and store network event information;
code means for interfacing with network elements that monitor individual network elements for an occurrence of a network element event and collect and store network element event information;
code means for calculating dependability parameters based on network event information and network element event information, wherein the code means for calculating dependability parameters comprises code means for correlating network event information and network element event information;
code means for calculating dependability metrics based on measured network events and network element events over a user-defined time period; and
code means for reporting dependability parameters and dependability metrics.

* * * * *